United States Patent [19]

Swanson

[11] 3,898,590

[45] Aug. 5, 1975

[54] PROGRESSIVE AMPLITUDE MODULATOR

[75] Inventor: Hilmer I. Swanson, Quincy, Ill.

[73] Assignee: Harris-Intertype Corporation, Cleveland, Ohio

[22] Filed: Dec. 26, 1973

[21] Appl. No.: 427,520

[52] U.S. Cl. .................. 332/31 T; 307/29; 307/262; 307/297; 328/147; 328/260; 332/43 B; 332/59

[51] Int. Cl. .............................................. H03c 1/38

[58] Field of Search ..... 332/31 R, 31 T, 43 R, 43 B, 332/59; 307/262, 264, 297, 23, 29, 41; 328/71, 146, 147, 260

[56] References Cited

UNITED STATES PATENTS

| | | | |
|---|---|---|---|
| 2,863,123 | 12/1958 | Koch | 332/31 T |
| 3,205,458 | 9/1965 | Geery | 332/31 T |
| 3,479,616 | 11/1969 | Hazzard | 332/43 B |
| 3,551,788 | 12/1970 | Summer | 307/297 X |
| 3,566,308 | 2/1971 | Hugenholtz | 332/31 T |
| 3,810,047 | 5/1974 | Gehring | 332/43 B |

*Primary Examiner*—Alfred L. Brody

[57] ABSTRACT

An amplitude modulator, which has a combining circuit for combining a carrier wave with a power modulating signal to control the amplitude of an output wave of carrier frequency in accordance with the power modulating signal, is very efficient and has low distortion. The power modulating signal is produced by two transistors, one of which is energized by a low DC power supply voltage and the other by a high DC power supply voltage. The lower-voltage transistor alone performs the modulation when an input modulation signal voltage is in the lower-voltage half of its range, and the higher-voltage transistor alone operates to perform the modulation when the input modulation signal is in the higher-voltage half. Neither transistor dissipates much power when the input modulation signal voltage is in the center of its operating range or when the other transistor is active to perform the modulation.

13 Claims, 6 Drawing Figures

PROGRESSIVE AMPLITUDE MODULATOR

BACKGROUND OF THE INVENTION

This invention relates to modulators for amplitude-modulating carrier waves, and it is particularly useful in modulators for modulating a carrier wave to any of a continuum of values of amplitude within a modulating range. Many amplitude modulators of the prior art are either relatively inefficient because they dissipate a great amount of power, or they require expensive modulation reactors or transformers, which limit the quality of performance for such uses as audio-frequency amplitude modulation of radio frequency waves. Distortion is introduced by the reactances of the reactors and transformers that are employed in many modulators of the prior art. The waveform distortion is difficult to reduce with negative feedback around the distorting elements because the frequency response of the reactors and transformers is often so poor as to make great amounts of degenerative feedback impractical at higher frequencies of the desired frequency range. Moreover, because of the impracticality of employing great amounts of negative feedback at the relatively higher frequencies, the components of noise which are introduced in the power stages of the modulator cannot be reduced effectively by feedback. The reduced availability of feedback at very high audio frequencies in such inductive types of modulators prevents the frequency response from easily being made uniform over a wide frequency range.

SUMMARY OF THE INVENTION

The present invention is a modulator for amplitude-modulating a carrier wave without the necessity of employing audio modulation reactors or transformers, but which nevertheless provides low distortion and relatively high efficiency, because the range of input modulation signal is divided into two or more regions or voltage strata. In one embodiment of the modulator, two power transistors are employed, connected in series with the output circuit of an RF power amplifier. The bases of both the transistors are under the control of an input modulating signal. The higher voltage transistor of the series-connected pair of transistors receives DC power for its collector from a relatively high voltage output of a multiple-output DC power supply, and the junction between the two series-connected transistors receives a voltage of about one-half of the higher voltage from a different terminal of the power supply. With no modulation, the collector current of the higher-voltage transistor is just cut off, and the lower-voltage transistor is at or near collector current saturation. Thus, there is very little power dissipation in either transistor when the modulation is zero. The higher-voltage transistor is active during positive lobes of amplitude modulation, and the lower-voltage transistor is active during negative lobes of modulation. Only one transistor at most dissipates significant amounts of power at a time, because the collector current of the other transistor is either in saturation or is cut off.

In more general terms, the inventive concept of the progressive amplitude modulator described herein can be employed for two or more strata of input modulating signal levels, and can be embodied in either a series arrangement of the power semiconductors such as was just described, or in a shunt arrangement.

Accordingly, one object of the present invention is to provide an amplitude modulator having a combining circuit for combining an unmodulated carrier signal with a power modulation signal in which the power modulation signal is produced by circuitry including a power supply with a plurality of different DC voltages, and including a modulation circuit receiving an input information signal over a range, and having a plurality of impedance devices each associated with a different respective one of the DC voltages and with a different fractional portion of the total range of input modulation signal, and in which each of the impedance devices dissipates very little power except when the input information signal is in its respective portion of the total range, and in which only a respective one of the different DC voltages is utilized at any one time.

Another object is to provide an amplitude modulator as above and in which the impedance devices, which may be transistors for example, are connected in series, and in which those of the series impedance devices which are between the combining circuit and the particular impedance device currently being utilized are in their most conductive state, for example, current saturation in the case of a transistor.

Still another object is to provide an amplitude modulator having two series-connected transistors in the power stage of the modulating signal portion of the modulator; and in which, when the input modulating signal voltage is higher than a predetermined level, the series transistor which is connected to the higher of two power supply voltages is operative to perform the modulation and the lower voltage transistor is in saturation; and in which, when the input modulating signal voltage is below the predetermined level, the lower voltage transistor is active to perform the modulation by utilizing power received from the lower-voltage power supply output, and the higher voltage transistor has negligible collector current.

A further object of the invention is to provide an amplitude modulator as in the first object and in which each of the DC power supply outputs is connected to a different impedance means and in which, instead of the plurality of impedance means being in series with each other, the outputs of all of the impedance means are connected together at the combining circuit.

Another object is to provide an amplitude modulator in which a relatively great amount of degenerative feedback can be employed over a frequency range including relatively high modulating frequencies, to improve the frequency response and minimize distortion and noise of the modulator.

Another object of the invention is to provide an amplitude modulator in which power from the power source is conserved, and in which heat disposal problems are thereby reduced, and whose components are relatively inexpensive because they have low power ratings, and in which the fidelity is high and the noise is low because a relatively great amount of negative feedback can be employed even for relatively high modulating frequencies.

Other objects and features of the invention will become more apparent upon consideration of the drawings and the following description.

DESCRIPTION OF A PREFERRED EMBODIMENT

Figure 1:
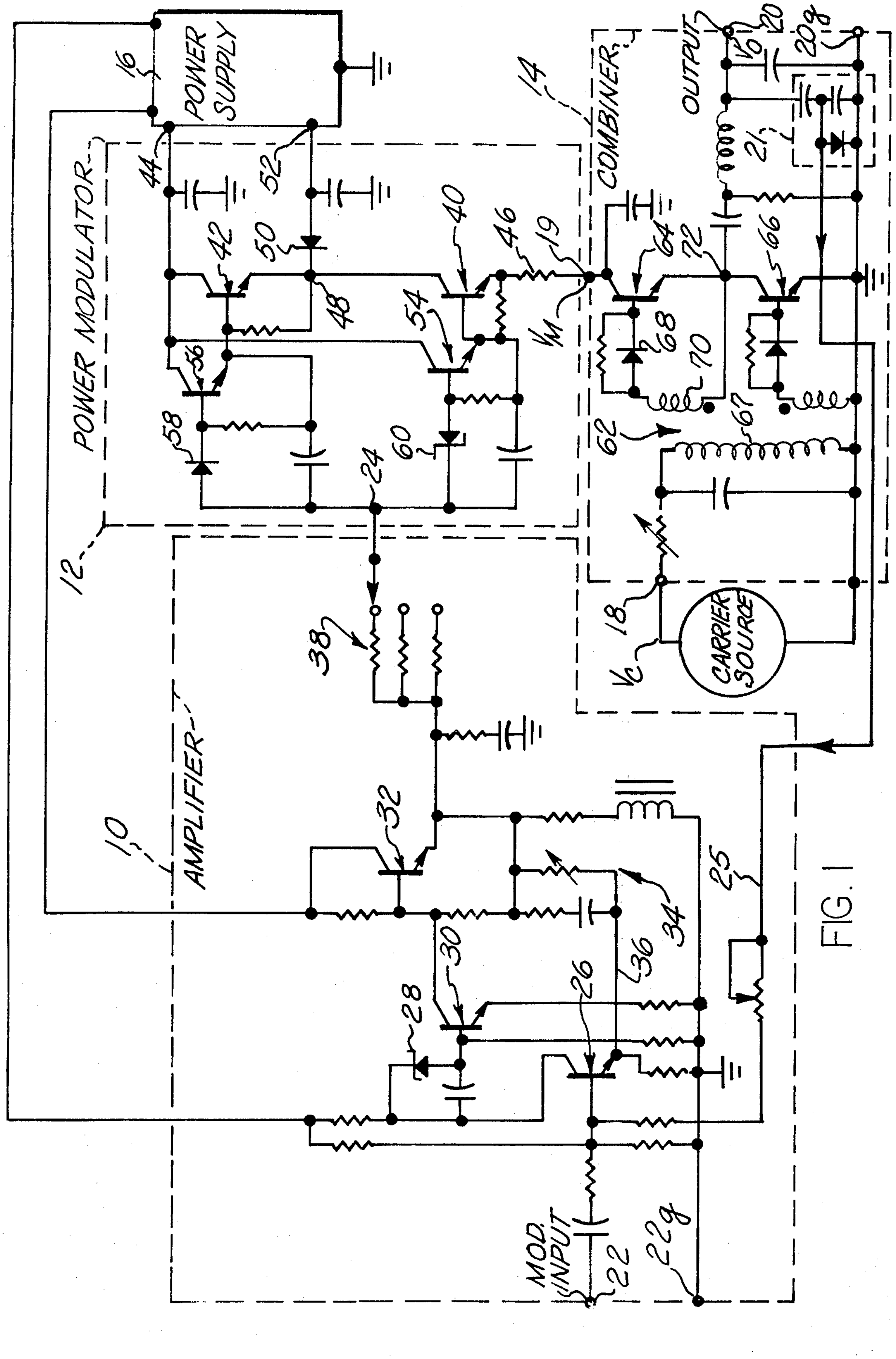
FIG. 1 is a circuit diagram of a preferred embodiment of the modulator employed for amplitude-modulating a transmitter with an audio-frequency modulating signal.

A preferred embodiment of the progressive amplitude modulator is shown in FIG. 1. Its purpose is to amplitude-modulate a carrier signal in accordance with a modulating signal of lower frequency, performing the modulation with high efficiency and low distortion. An amplifier 10, a power modulator 12, a combiner 14 for combining the carrier and modulating signals, and a power supply 16 are the major components of the preferred embodiment. The principal inputs and outputs are a modulation input signal that enters the amplifier 10 at terminals 22, **22*g*, a carrier signal that enters the combiner 14 at a terminal 18, and an amplitude-modulated carrier output signal from the combiner 14 at terminals 20, 20*g*. Terminals 22*g* and 20*g*** are ground terminals.

The general principal of operation of the modulating system is that the power supply 16 provides power through paths of the power modulator 12 to the combiner 14. The power modulator 12 absorbs or subtracts varying amounts of voltage drop from the voltage provided by the power supply 16, leaving only the remainder voltage for use by the combiner 14 in producing RF output signals. The amount of voltage drop in the power modulator 12 is controlled in accordance with the modulating signal. The combiner 14 has an unmodulated carrier input signal at the terminal 18, and it produces a modulated carrier output at the terminal 20 whose amplitude is limited by the amount of voltage available to the combiner at a terminal 19, after the power modulator 12 has subtracted a variable portion of voltage from the total available power supply voltage.

Figure 2A:
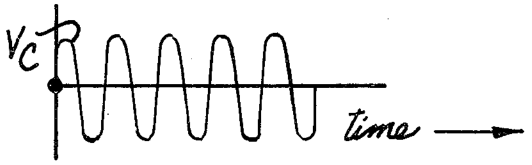
FIG. 2A shows an unmodulated carrier input voltage to the modulator as a function of time.
Figure 2B:
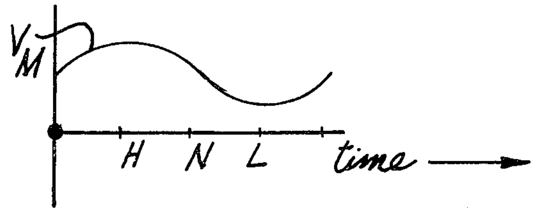
FIG. 2B is a modulating voltage with which the carrier wave is to be modulated, shown as a function of time.
Figure 2C:
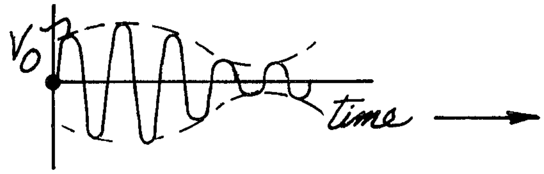
FIG. 2C is an amplitude-modulated carrier wave provided at the output of the modulator.

The combiner 14 is known and used in the prior art. The unmodulated carrier wave voltage $V_C$, which is applied to the terminal 18 of the combiner 14, is shown in FIG. 2A as a function of time. A modulating voltage $V_M$, which is applied to the terminal 19 of the combiner 14, is shown in FIG. 2B, to the same time scale as was used in FIG. 2A. The terminal 19 having the modulating voltage $V_M$ is a source of input power for the combiner 14. Also shown to the same time scale is the output voltage $V_O$ of amplitude-modulated carrier wave, in FIG. 2C, which appears at the final output terminal 20 of combiner 14 for application to a load, for example, to an antenna.

The modulating voltage $V_M$ of FIG. 2B is a replication of an input modulating voltage applied to an input terminal 22 of the amplifier 10, except that the voltage $V_M$ at terminal 19 is of different amplitude and has a DC offset component. The same modulating voltage waveform appears also at a terminal 24 between the output of the amplifier 10 and an input to the power modulator 12.

The amplifier 10 is a three-stage direct-coupled transistor amplifier. Its principal functions are to ampliify an AC input modulating signal received at its input terminal 22 and to apply its amplified output signal, along with an appropriate DC offset voltage, to the power modulator 12 at the terminal 24. The amplifier 10 preferably has sufficient open-loop gain to permit the employment of 6 dB or more of negative feedback to improve the frequency response and minimize the distortion and noise of the system. A circuit 25 conducts the feedback signal from an envelope detector 21 of the power modulator 12 to an input transistor 26 of the amplifier 10.

An input modulating signal, which may be, for example, an audio frequency signal, is conducted from the input terminal 22 of the amplifier 10 through a coupling capacitor to the base of a first transistor 26, where it is amplified. The amplified signal at a collector terminal of the transistor 26 is directly coupled through a bias-determining Zener diode 28 to the base of a second transistor amplifier 30, where it is further amplified. The base of a third transistor 32 receives an input signal from the collector of the second transistor 30; the third transistor functions as an emitter follower to develop an output voltage across a filter and local feedback circuit indicated generally at 34. A feedback conductor 36 provides some degeneration for part of the amplifier 10 by applying a portion of the output signal of transistor 32 to the emitter circuit of the input transistor 26. An attenuator 38 enables the selection of various open-loop gains of the amplifier 10, the output from the attenuator 38 being connected to the input terminal 24 of the power modulator 12.

The power modulator 12 controls the voltage drop between the power supply 16 and the power input terminal 19 of the combiner circuit 14, and thereby provides a modulating input signal for the combiner circuit 14. The power modulator controls this voltage drop in accordance with the modulating signal received at its input terminal 24 from the amplifier 10.

The power modulator 12 includes two main power transistors 40, 42, whose collector-emitter circuits are connected in series from a DC output terminal 44 of the power supply 16 (having, for example, positive 90 volts), and thence through a buffer resistor 46 at the emitter of the transistor 40 and to the terminal 19 of the combiner 14. At a junction 48 between the emitter of the transistor 42 and the collector of the transistor 40, connection is made through a diode 50 to receive DC power under certain conditions from a lower-voltage output terminal 52 of the power supply 16, preferably having positive 45 volts. The transistors 40, 42 are driven at their bases by signals from the emitter of a corresponding driver transistor 54, 56 respectively. The bases of the driver transistors 54, 56 are connected with the input terminal 24 of the power modulator 12, to receive the modulating signal. The base electrode of the transistor 56 is energized through a diode 58 from this input terminal 24 and the transistor 54 is energized through a Zener diode 60, to provide a small DC voltage offset for the modulating signal derived from the terminal 24.

When the modulating voltage at the terminal 24 has a particular value, which preferably is near the center of the range of variations of the modulating signal, the transistor 54 is in a highly conductive state and its emitter current flows through the base-to-emitter circuit of the transistor 40 to make the transistor 40 highly conductive also, preferably just sufficient to produce a saturation level of collector current flow in the transistor 40. Collector current flows to the transistor 40 under the condition now being described from the 45 volt power supply terminal 52 through the diode 50. The intermediate value of voltage at the terminal 24 for which conditions are presently being described is insufficient to create appreciable emitter current in the transistor 56. Consequently, the higher-voltage series transistor 42, which is ordinarily driven by the driver transistor 56, has a negligible collector current. Thus, with one particular intermediate value of modulating voltage at the terminal 24, the lower-voltage transistor 40 operates in a saturated collector current condition, in which very little power is dissipated, and the higher-voltage transistor 42 operates in a collector current cutoff condition, in which very little power is dissipated. The particular intermediate value of modulating signal voltage at the terminal 24 which gives rise to the condition just described, in which neither of the power transistors dissipates significant power, is preferably chosen to be the voltage level for which the corresponding modulating signal voltage at the input terminal 22 is zero. A corresponding power modulating signal voltage $V_M$ is the voltage at a time N of FIG. 2B.

When the modulating signal voltage at the terminal 24 is below the particular intermediate value described above, modulation is being performed and the modulating signal at terminal 19 may, for example, be at a lower voltage value such as is shown at a time L of FIG. 2B. Under this condition, the transistor 40 is receiving current for its collector from the relatively low-voltage power supply terminal 52, and is absorbing an appreciable portion of that voltage and applying only the remainder to the output terminal 19 of the power modulator 12. At the same time, the higher-voltage transistor 42 is inactive, with its collector current cut off. Consequently, very little power is being dissipated in the higher-voltage transistor 42 when the modulating signal has values below the predetermined intermediate value. The modulator 12 is therefore seen to operate relatively efficiently during negative lobes of modulating voltage because it operates from a relatively low voltage power supply terminal, namely the terminal 52, and not from the higher-voltage power supply terminal 44.

During positive excursions of the modulating signal voltage at the terminal 24 of the power modulator 12, the higher-voltage transistor 42 is active, and the lower-voltage transistor 40 is inactive with saturation-level current flowing in its collector circuit. The voltage drop across the higher-voltage transistor 42 during such positive-going excusions of the modulating voltage, as at the time H of FIG. 2B, is proportioned to the amount by which the modulating voltage exceeds the predetermined intermediate voltage value at N corresponding to no modulating signal. During positive excursions, modulating power is supplied from the power supply terminal 44, which in the present example provides 90 volts DC to the collector of the transistor 42. Current from the emitter circuit of the transistor 42 passes through the lower-voltage transistor 40 with relatively little voltage drop because of the current-saturated condition of the transistor 40, and flows to the terminal 19 of the combiner 14. The voltage at the junction 48 between the transistors 40 and 42 in this higher-voltage condition is great enough, relative to the voltage at the power supply terminal 52, to back-bias the diode 50 so that no current flows from the power supply terminal 52 to the power modulator 12. Because the power dissipation in the transistor 40 is very small when the transistor is saturated, the power modulator 12 is seen to operate relatively efficiently when the modulating signal voltage at the modulating input terminal 22 is positive.

To summarize, the power modulator has been shown to operate efficiently under conditions of no modulation, negative modulation signals, and positive modulation signals.

The power modulator 12 divides the total range over which the modulating signal at the terminal 24 is permitted to vary, into an upper portion of the range, for which the higher-voltage transistor 42 is active, and a lower portion of the range, for which the lower-voltage transistor 40 is active.

Voltage $V_M$ and current at the terminal 19 of the power modulator 12 are applied to the combiner 14 to limit the amplitude of the carrier signal $V_O$ appearing at the output terminal 20 of the combiner 14. The combiner 14 includes a carrier-frequency transformer 62 and two series-connected transistors, 64, 66, whose junction is a terminal 72. A primary winding 67 of the carrier-frequency transformer 62 is energized by the carrier signal $V_C$ applied to the carrier input terminal 18 of the combiner 14. The transistor 64 is responsive only to positive lobes of the carrier wave appearing at its base terminal because it is operated in a class C mode. The base electrode of the transistor 64 receives signals through a biasing diode 68 that is too slow to respond to the carrier-frequency component of signal, which comes from a secondary winding 70 of the carrier-frequency transformer 62. The transistor 66 is cut off. Thus, upon lobes of one polarity of the carrier-frequency transformer 62, the transistor 64 is rendered highly conductive, thereby connecting the junction terminal 72 almost directly to the modulating input terminal 19 of the combiner 14.

Upon carrier signal lobes of the opposite polarity, the transistor 66 is rendered highly conductive and the transistor 64 is cut off. Thereupon the junction 72 is almost short-circuited to ground through the transistor 66.

In this way, the junction terminal 72 is alternately subjected to ground voltage and to whatever modulating signal voltage currently exists at the modulating input terminal 19 of the combiner 14. The peak-to-peak amplitude of the carrier frequency signal at the junction 72 is therefore limited to approximately the magnitude of the modulating signal voltage at the terminal 19, so that the output voltage $V_O$ amplitude at the final output terminal 20 is controlled by the modulating voltage $V_M$ at the terminal 19. The amplitude-modulated signal at the junction 72 between the transistors 64 and 66 is conducted to the final output terminal 20 through a coupling capacitor and a low-pass filter which improves the output waveform $V_O$.

To summarize, the combiner 14 is seen to amplitude-modulate a carrier wave $V_C$ applied to the carrier wave input terminal 18, in accordance with a modulating signal $V_M$ applied to the modulating signal terminal 19, to produce an amplitude-modulated carrier wave $V_O$ at the final output terminal 20. When the modulating signal $V_M$ is in the upper half of the total voltage range of modulation, transistor 42 modulates the carrier and transistor 40 is saturated. When the modulating signal $V_M$ is in the lower half of the total voltage range of modulation, transistor 40 modulates the carrier and transistor 42 is cut off.

In the preferred embodiment described above, the modulation input signal range was divided into an upper portion and a lower portion. One impedance means, namely the transistor 42, was active for modulation signal values in the upper portion of the range, and another impedance means, namely the transistor 40, was active for modulation signal values in the lower portion of the range. The range of input signal values could equally well be divided into more than two portions, with a corresponding impedance means for each portion of the range. For example, in FIG. 3A, a three-impedance modulator is shown in which the modulating input signal is applied to a terminal 24' of a signal ranging circuit 74. The circuit 74 is very similar to the circuit 10 and portions of circuit 12 of FIG. 1. Circuit components and terminals of FIG. 3A have been given the same numbers as corresponding elements of FIG. 1 except that a prime mark has been added to the reference numerals of FIG. 3A. The lowest third of the modulating signal range is energized by a power supply terminal 52' having a relatively low voltage, through a switching device 50'. The switching device preferably is a diode such as the diode 50, although a three-terminal switching device could be employed instead, and controlled from the signal ranging circuit 74. The impedance Z1 of FIG. 3A corresponds to the transistor 40 of FIG. 1, and is active for the lowest third of the modulating signal range.

Figure 3A:
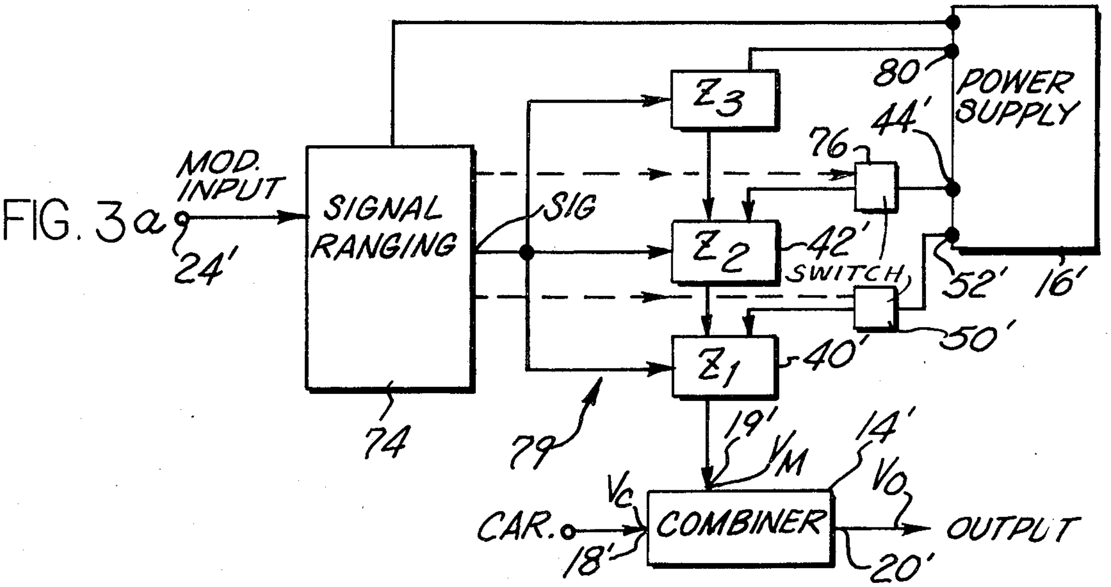
FIG. 3A is a simplified block diagram of a three-strata, series-connected, embodiment of the modulator.

In a similar manner, a power supply terminal 44' having an intermediate DC voltage level provides power to an impedance Z2 of FIG. 3A that corresponds to the transistor 42 of FIG. 1. Impedance Z2 is active to control the modulation signal $V_M$ passing into the combiner 14' at the modulating terminal 19' when the modulating input signal at terminal 24' is in the middle third of its range. A switching device 76 for connecting and disconnecting the power flow from the terminal 44' to the impedance Z2 is preferably a diode, but, like the device 50', may be a transistor which is rendered conductive and nonconductive depending upon whether the modulating input signal is or is not within a portion of the range corresponding to the respective switching means. Each of the impedances Z1, Z2, Z3 is provided with a modulating signal through conductors 79 from the signal ranging circuit 74. It is well within the skill of those of ordinary skill in the electronic arts to produce the circuit 74 for power supply and signal ranging, in view of the detailed circuit diagram of FIG. 1 for a two-level embodiment, which is almost identical. The combiner 14' of FIG. 3A is identical with the combiner 14 of FIG. 1.

Figure 3B:
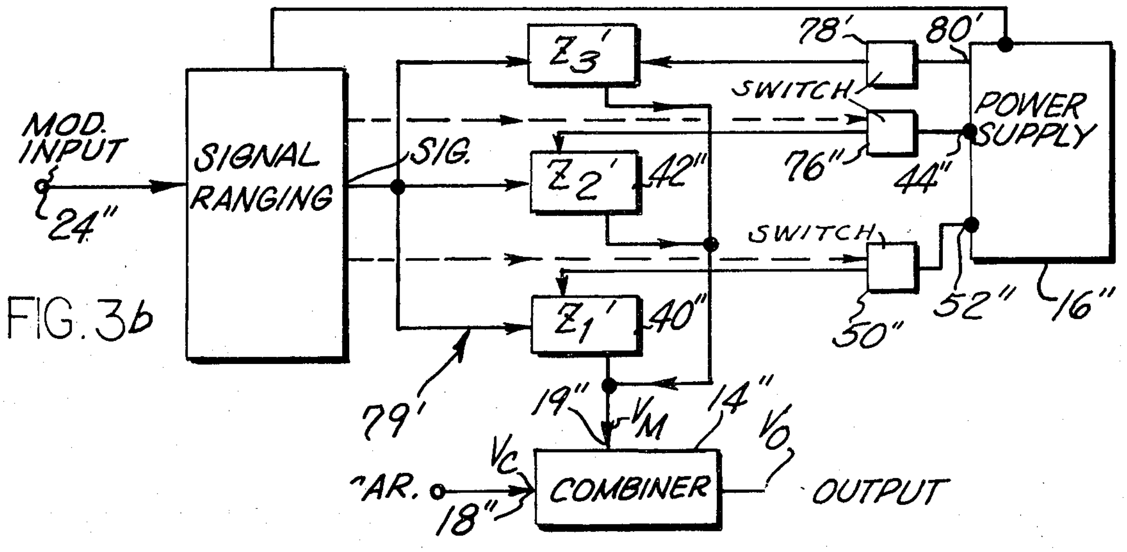
FIG. 3B is a simplified block diagram of a parallel-feed embodiment of the modulator.

FIG. 3B shows still another embodiment based upon the same general inventive concept described above. In FIG. 3B, the outputs of the impedances Z1', Z2', Z3' are all connected in parallel to the modulating input terminal 19'' of a combiner 14''. The combiner 14'' is identical with the combiner 14 of FIG. 1. Each of the impedances Z1', Z2', Z3' is supplied with a different DC voltage at terminals 80', 44'' and 52'' respectively, in series with a switching device 78', 76'' and 50'' respectively.

In FIG. 3B, each of the impedances Z1', Z2', Z3' receives on conductors 79' a modulating signal in accordance with the modulation input signal at the terminal 24''. DC voltage offset circuitry may be employed between the signal inputs to the impedances Z1', Z2', Z3' if necessary, such as diode 60 of FIG. 1. The complete range of modulating input signal voltages is divided here into three strata, although two, four, or more strata could equally well be provided. When the signal is in the lowest portion or stratum of the range, only the impedance Z1' is active, the switch 50'' being in a conductive state. The impedances Z2', Z3' are inactive and in a low power dissipation condition. If desired, switching means 76'' and 78'' may be placed in a nonconducting condition at the time of utilization of the lowest portion of the signal range. Switching can be controlled by simple threshold circuits that are known in the prior art to make inactive impedances nonconductive, either by opening the switches such as 76'', or by biasing inactive impedances such as Z1' to cut off.

In a similar manner, one at a time of the impedances Z2' or Z3' may be employed to perform the modulating function, with the other two impedances being disabled in a nondissipative condition, when the modulating input signal is in portions of its range corresponding respectively to the impedances Z2', Z3'. FIG. 3B is seen to be a shunt feed embodiment of the invention.

Because the modulator is efficient, power from the power source is conserved, heat disposal problems are reduced, and components can be less expensive because they can have lower power ratings. The efficiency is high, as is exemplified in the embodiment of FIG. 1, because the higher-voltage transistor 42 has essentially zero current and hence essentially zero power dissipation when the input modulation voltage is at or below its center value, and because the lower-voltage transistor 40 has essentially zero collector-to-emitter voltage and consequently dissipates negligible power when the input modulating voltage is at or above its center value. For AC modulation signals, the component of power dissipation in the modulator final stage that corresponds to the DC component of voltage at terminal 24, is therefore almost zero.

The total cost of components of the circuit is relatively low because no modulation transformer or modulation reactor is required in the power modulator 12. The cost is also reduced because the modulation transistors 40, 42 need not have high power dissipation ratings. Moreover, for AC modulation such as audio modulation, the required average power dissipation is divided approximately equally between the two modulator output transistors 40, 42.

Only a small amount of large-modulation signal distortion occurs such as is present in nonlinear modulators of, for example, a square-law type. No phase inversion is necessary as in push-pull circuits, although some of the advantages of push-pull circuits are present in this circuit.

With regard to external modulation characteristics, the modulator is capable of linear modulation just as in a class B or class AB modulator circuit of the prior art, although each of the two output audio transistors of the modulator alone operates nonlinearly. The power modulator circuit has a DC output level that is convenient for connection to the collector terminal of an RF transistor such as transistor 64 for amplitude modulation, because the modulation transistors 40, 42, are connected in series with power supply outputs such as the terminals 52, 44, of the power supply 16.

When the progressive amplitude modulator is employed in the preferred circuit of FIG. 1, the RF amplifier output $V_C$ applied to the terminal 18 of the combiner 14 can have relatively low power because it need provide only control power for the RF combining transistors 64, 66; most of the output power comes from the efficient power modulator 12. Also, when the modulator 12 of the present invention is used in that preferred embodiment, the RF combining transistors 64, 66 dissipate very little power, because they are utilized in a switching mode of operation. As the input signal swings about in the preferred embodiment of FIG. 1, no ancillary control circuits are required to transfer modulation control from the lower-voltage modulation transistor 42 to the higher-voltage modulation transistor 40, and vice versa, because the blocking diode 50 at the low voltage power supply terminal 52 automatically performs the transfer or switching of the power supply. The bases of both the lower-voltage and higher-voltage modulation transistors 40, 42, have voltage excitation at all times.

It may be noted that in all of the disclosed embodiments, the power dissipation is also small in the transfer devices such as devices 50, 50′ or 50″ which perform switching of the power supply voltages to the impedance elements. The impedance elements 40, 42, Z1, Z2, Z3, Z1′, Z2′, Z3′, can be operated in a class B mode in which their overlap of ranges is negligible, or in a class AB mode in which sufficient overlap of transistor ranges is provided for a smooth handover from one portion of the input signal range to another so as to minimize the reliance upon feedback for achieving high fidelity.

The progressive amplitude modulator can, of course, be used for pulse height modulation of signals to modulate only at a plurality of predetermined amplitude levels, instead of or in addition to the use over a continuum of modulating signal values as described in the preferred embodiment. Great amounts of negative feedback can be used over a wide range of modulation frequencies, and connected for example, from the conventional envelope detector 21 to the base of the input transistor 26, to minimize distortion and noise and to improve the frequency response of the modulator. Feedback can be used to higher frequency limits with the present circuit then in modulating circuits employing transformers or reactors because the transformers or reactors limit the maximum frequency much more than does the progressive amplitude modulator described herein.

I claim:

1. In an electrical circuit for modulating a carrier wave, combining means for modulating the amplitude of a carrier wave in accordance with a varying characteristic of a modulating control signal which varies in accordance with a varying characteristic of an input signal, said combining means having an input to which said modulating control signal is to be applied, and first circuit means having an input to which said input signal is applied and an output connected to said input of said combining circuit, said first circuit means comprising a first d.c. power source providing a voltage of a first magnitude, a second d.c. power source providing a voltage of magnitude which is higher than said first power source, first modulating means of variable conductivity connected to said first power source and said output of said first circuit means to supply modulated signal current to said output over a first range from a minimum to a first predetermined level, second modulating circuit means of variable conductivity connected between said second power source and said output for supplying modulated signal current to said output over a second range from said first predetermined level to a higher second predetermined level, and control means connected to said first modulating means for effecting modulation of said first modulating means in accordance with a first range of said input signal corresponding to said first range of said modulating control signal to supply substantially all of the current to said output from said first power source up to said predetermined level and to said second modulating means to vary the conductivity thereof in accordance with said input signal to effect the supply from said second power source to said output of substantially all the modulating signal current when the current is to be in said second range of said modulating control signal for a corresponding second range of said input signal higher than the first range thereof including means for applying a signal corresponding to said input signal to each of said modulating means.

2. In an electrical circuit for modulating a carrier wave as defined in claim 1 wherein said control means includes means for blocking current flow from said first power source to said output when said input signal exceeds its said first range.

3. In a modulating circuit for modulating a carrier wave as defined in claim 1 wherein said first modulating means is connected in series with said second modulating means and said control means includes biasing means for rendering said first modulating means in a substantially non-dissipative current conducting condition as said input signal exceeds said first range.

4. In an electrical circuit for modulating a carrier wave as defined in claim 3 wherein said control means includes means for blocking current flow from said first power source to said output when said input signal exceeds its said first range.

5. In an electrical circuit for modulating a carrier wave as defined in claim 1 wherein said control means comprises threshold means for blocking current flow from said first power source to said output as said input signal exceeds said first range.

6. In an electrical circuit for modulating a carrier wave as defined in claim 2 wherein said means for blocking said current flow comprises means responsive to current flow in said second modulating means for effectively disconnecting said first source.

7. In an electrical circuit for modulating a carrier wave as defined in claim 1 wherein said control means comprises means responsive to said input signal being in a particular one of its said ranges to render a corresponding one of said modulating means active and each of said modulating means being connected in parallel between its corresponding power source and said output of said first circuit means.

8. In an electrical circuit for modulating a carrier wave as defined in claim 7 wherein said means responsive to said input signal comprises a switching means for effectively connecting and disconnecting each of said power sources from its corresponding modulating means, and means responsive to said input signal for switching said switching means between conditions connecting and disconnecting said power supplies to said modulating means.

9. In an electrical circuit for modulating a carrier wave, combining means for modulating the amplitude of a carrier wave in accordance with a varying characteristic of a modulating signal which varies in accordance with a varying characteristic of an input signal, said combining means having an input to which said modulating signal is to be applied, and first circuit means having an input to which said input signal is applied and an output connected to said input of said combining circuit, said first circuit means comprising a plurality of d.c. power sources providing a plurality of successively higher voltages proceeding from a first one to a last one, each of said power sources having a corresponding variable impedance connected to the source and to said output, each of said variable impedances having a control element for varying the impedance in response to the magnitude of a signal applied thereto to effect modulation of current from its corresponding source to said output, control means for applying signals to said control elements which vary in accordance with said input signal and for rendering one of said power supplies and its corresponding modulating means effective to supply modulated signal current to said output including biasing circuit means for rendering each of said modulating means effective to modulate current for different ranges of said input signal between the minimum and maximum magnitude of said input signal.

10. In an electrical circuit as defined in claim 9 wherein said modulating means are connected in parallel between their respective sources and said output and said control means comprising switching means for effectively connecting and disconnecting at least each of said power sources other than said last one from connection to said output through its modulating means and control means responsive to said input signal to sequentially actuate said switching means as said input signal varies from a minimum to the range corresponding to said last modulating means.

11. In an electrical circuit as defined in claim 9 wherein said modulating means each comprises a transistor having load electrodes connected in series circuit with the load electrodes of the transistor of the other of said modulating means, each of said power supplies being connected to the said series circuit at a load electrode of the transistor of the corresponding modulating means.

12. In an electrical circuit as defined in claim 11 wherein each of said power supplies between the last one of said power supplies and said output has a diode in its connection between the power supply and said series circuit to block current flow from the power source when the voltage at its connection to said series circuit is higher than the voltage magnitude of the power source.

13. In an electrical circuit as defined in claim 11 wherein said control means comprises for effecting the biasing of each of said transistors to a saturated range in response to said input signal exceeding the range corresponding to the range in which the transistor is to effect modulation of the modulating signal for said combining means.

* * * * *